United States Patent [19]

Tanaka

[11] Patent Number: 5,031,088
[45] Date of Patent: Jul. 9, 1991

[54] VARIABLE-VOLTAGE & VARIABLE-FREQUENCY POWER CONVERTER

[75] Inventor: Shigeru Tanaka, Inagi, Japan
[73] Assignee: Kabushiki Kaisha Toshiba, Kawasaki, Japan
[21] Appl. No.: 501,718
[22] Filed: Mar. 30, 1990

[30] Foreign Application Priority Data

Mar. 31, 1989 [JP] Japan ................................. 1-78410
Jun. 2, 1989 [JP] Japan ................................ 1-139139
Jun. 12, 1989 [JP] Japan ............................... 1-146882

[51] Int. Cl.⁵ ........................................ H02M 7/521
[52] U.S. Cl. .................................... 363/71; 363/96; 363/136
[58] Field of Search ................. 363/65, 71, 72, 95, 363/96, 135–138

[56] References Cited

U.S. PATENT DOCUMENTS 4,674,025  6/1987  Edwards ............................ 363/71
4,698,739 10/1987  Paice .................................. 363/71
4,717,998  1/1988  Cheron et al. ..................... 363/71
4,802,079  1/1989  Mizoguchi ......................... 363/71

FOREIGN PATENT DOCUMENTS 2245124  4/1975  France .
0063575  5/1980  Japan ................................. 363/71
0058782  5/1981  Japan ................................. 363/71
58-54745 12/1983  Japan .

Primary Examiner—Peter S. Wong
Attorney, Agent, or Firm—Oblon, Spivak, McClelland, Maier & Neustadt

[57] ABSTRACT

A power converter for supplying an AC load with a sum of an output voltage of multiplexed PWM inverters each having an output transformer, and an output voltage from a direct-connection PWM inverter having no output transformer. One or a plurality of PWM inverters constituting the multiplexed PWM inverters comprise a circuit for controlling primary or exciting currents of corresponding output transformers connected thereto, and the direct-connection PWM inverter comprises a circuit for controlling a current to be supplied to the AC load.

9 Claims, 15 Drawing Sheets

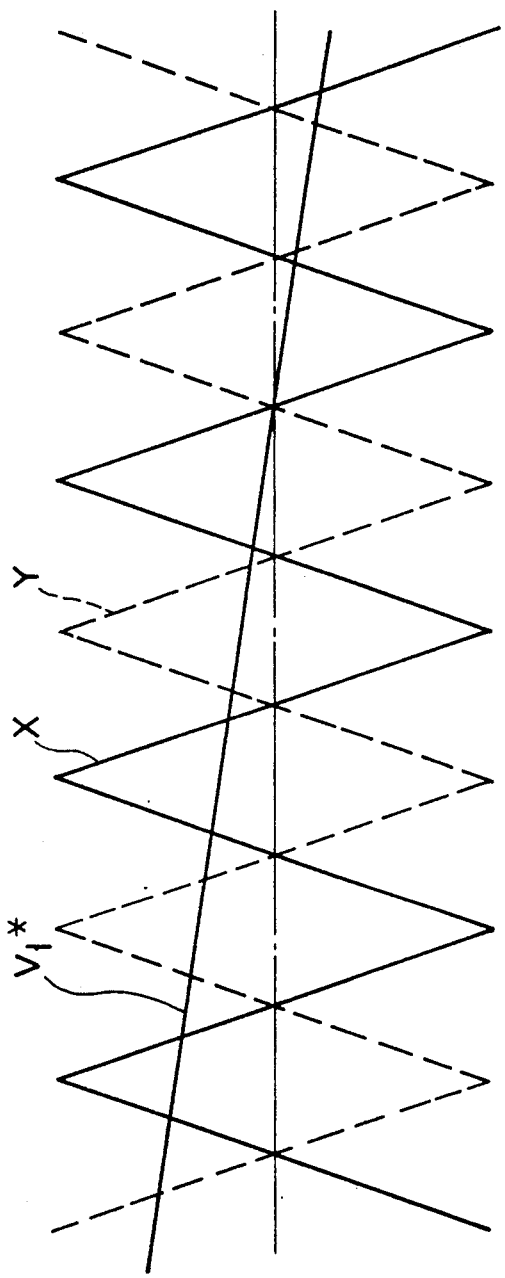
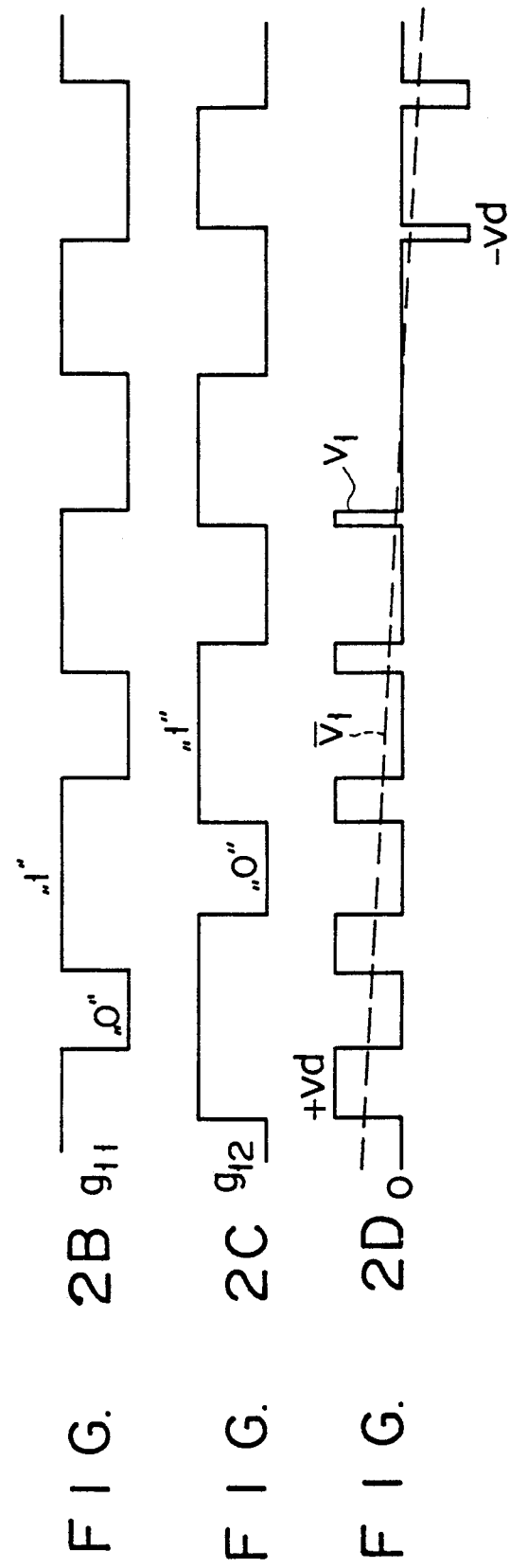
FIG. 2A
FIG. 2B
FIG. 2C
FIG. 2D

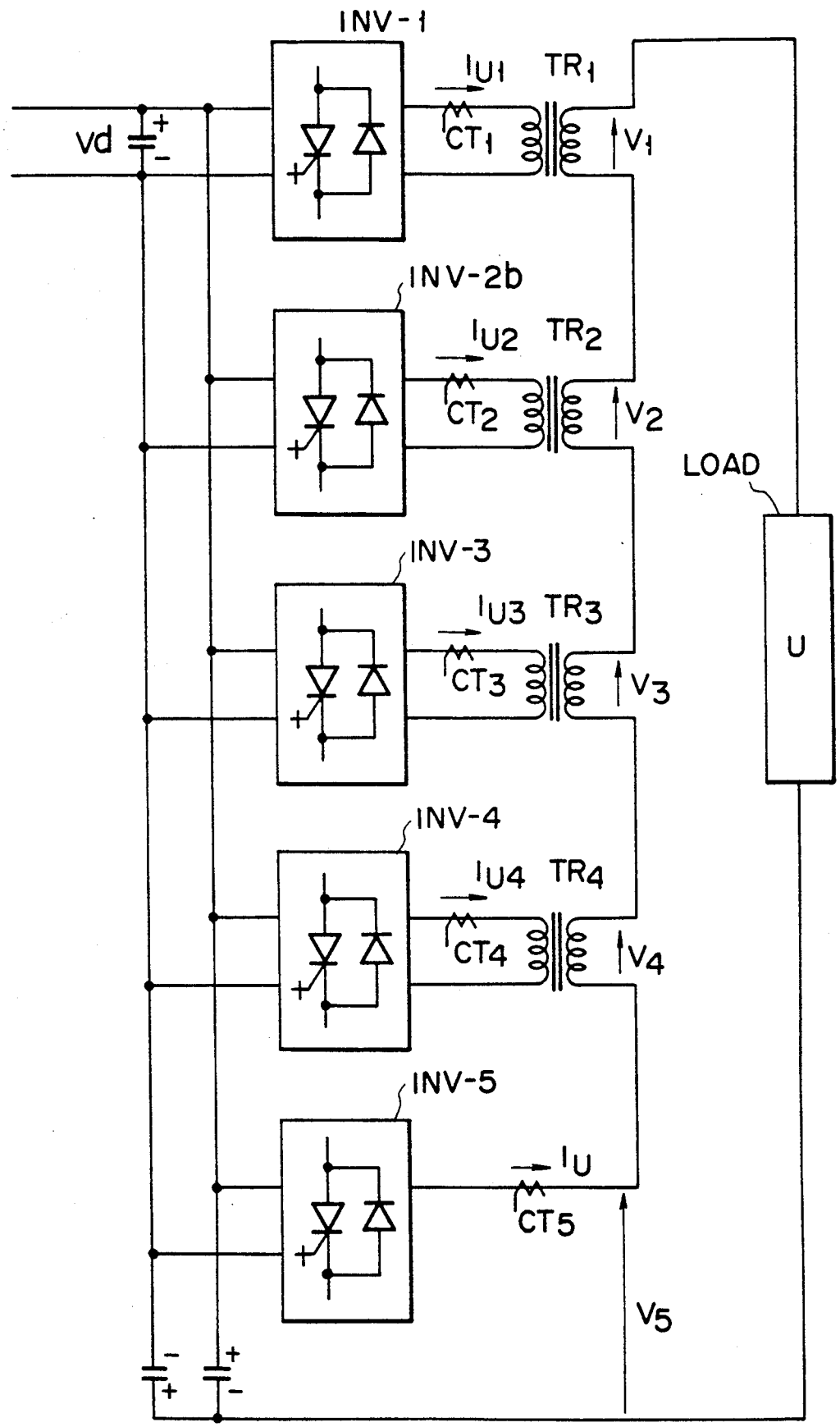
F I G. 7

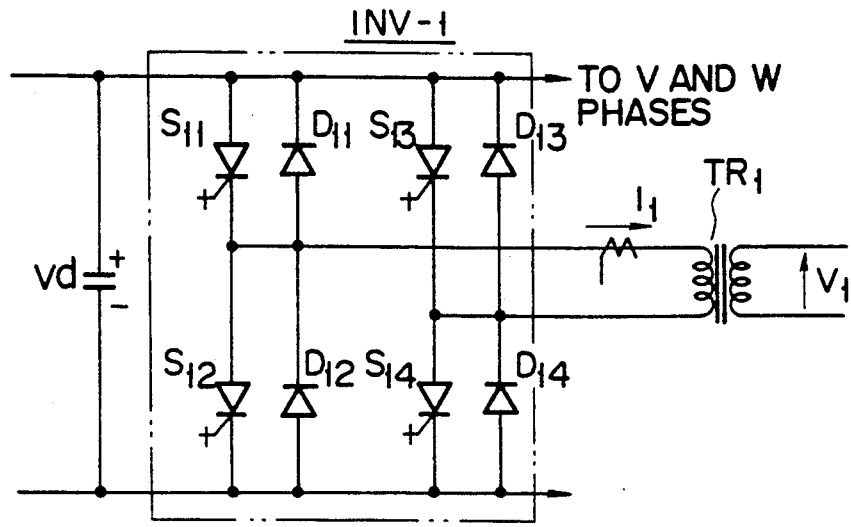
FIG. 9
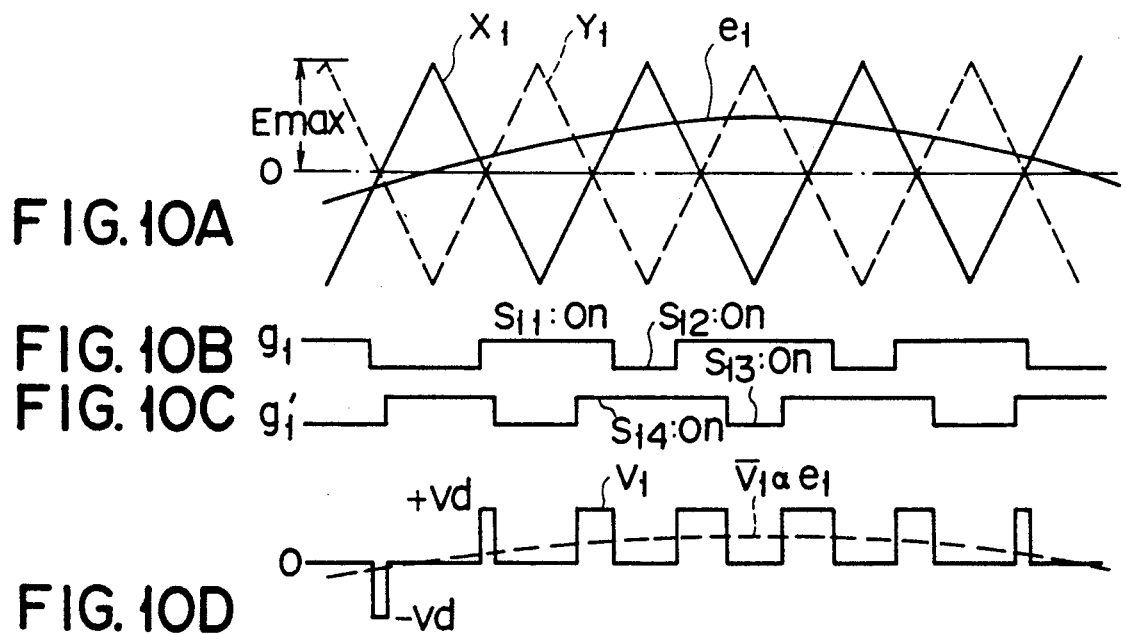
FIG. 10A
FIG. 10B
FIG. 10C
FIG. 10D

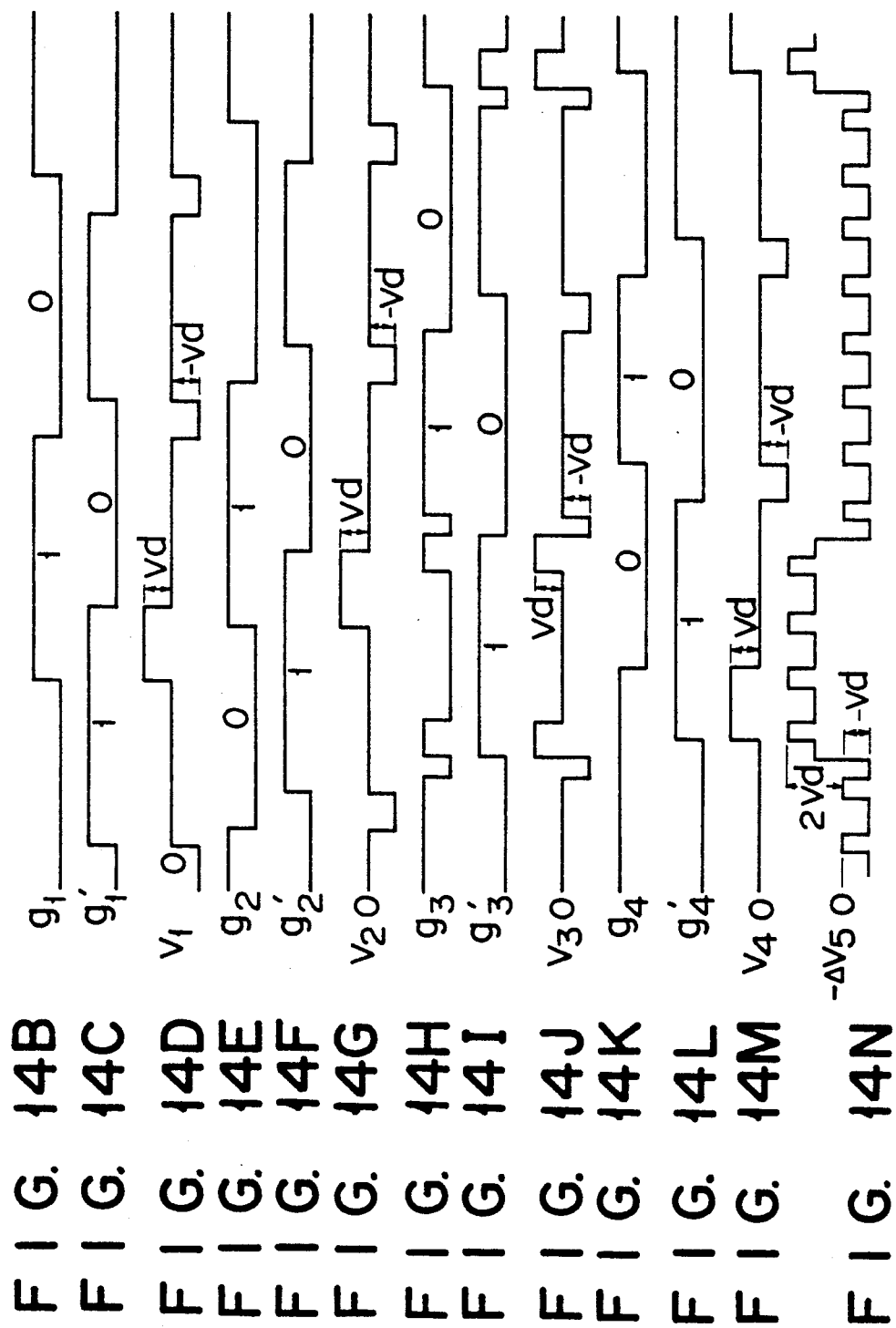

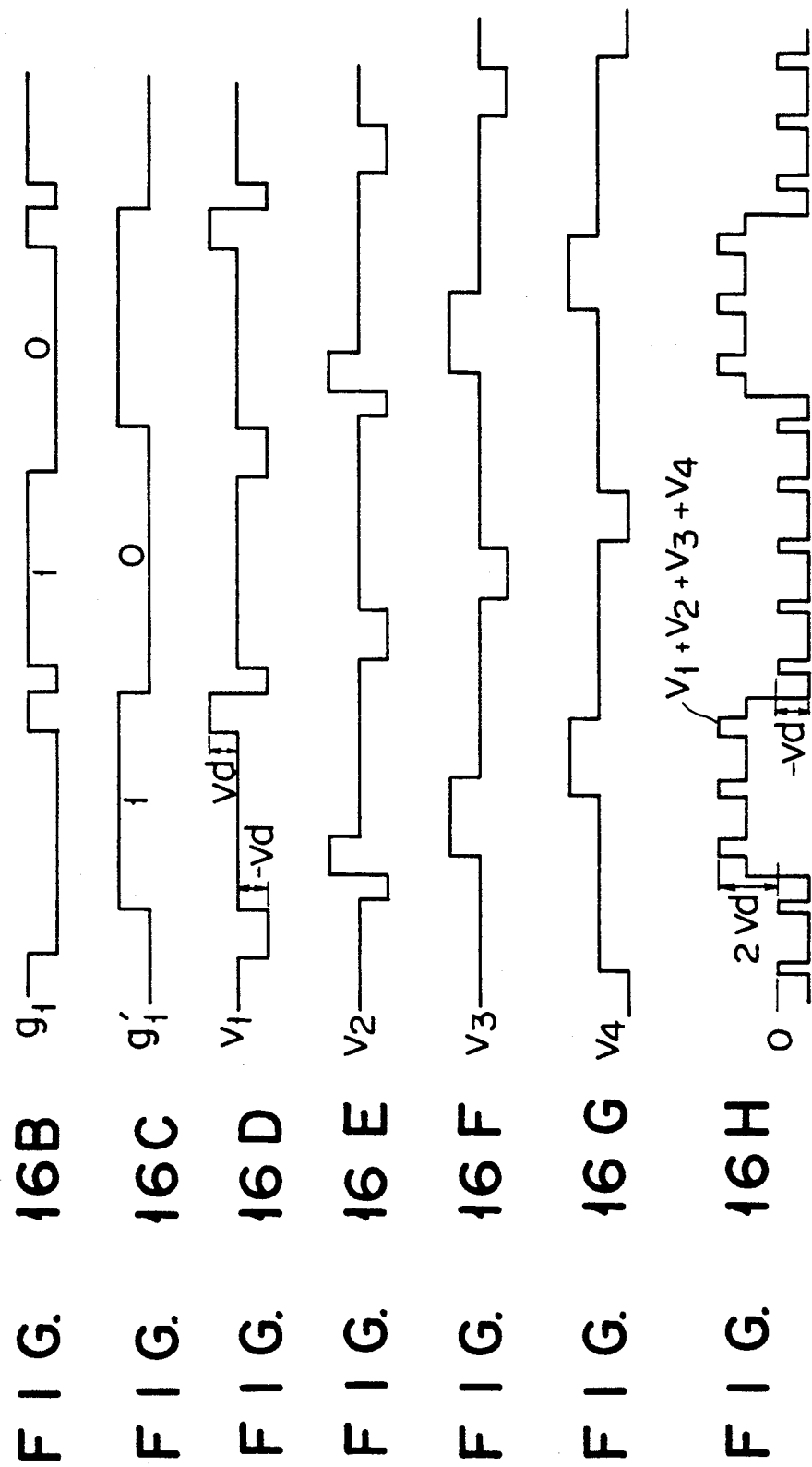

VARIABLE-VOLTAGE & VARIABLE-FREQUENCY POWER CONVERTER

BACKGROUND OF THE INVENTION

1. Field of the Invention

The present invention relates to a variable-voltage and variable-frequency electric power converter for a load such as a motor, and a method of controlling the same.

2. Description of the Related Art

A conventional power converter comprises a DC smoothing capacitor serving as a DC voltage source, a first inverter, a second inverter, an output transformer, a load device, a load current detector, a comparator, a current control/compensation circuit, a proportional amplifier, pulse-width modulation (PWM) controllers, etc.

The first and second inverters are PWM control inverters for converting a DC voltage into a variable-voltage and variable-frequency AC voltage. The first inverter generates output voltage $V_{L1}$ through the output transformer. The second inverter directly generates output voltage $V_{L2}$. The load device is applied with a voltage of $V_L = V_{L1} + V_{L2}$. Voltage $V_L$ is adjusted to control load current $I_L$.

When output frequency $f_0$ is zero, since no voltage $V_{L1}$ can be generated from the output transformer, the second inverter controls load current $I_L$, and when frequency $f_0$ is increased to a certain level, the first inverter controls load current $I_L$ in turn.

FIGS. 17 and 18 show load terminal voltage $V_L$ and input signals $V_1^*$ and $V_2^*$ of the PWM controllers of the first and second inverters as a function of output frequency $f_0$ in the conventional power converter.

When load current $I_L$ is assumed to be constant, load terminal voltage $V_L$ is expressed by output frequency $f_0$ as follows:

$$V_L = V_C + I_L \cdot R_L + j\omega_0 L_L I_L \qquad (1)$$

$V_C$: counter electromotive force of load (for motor)
$R_L$: resistance of load
$L_L$: inductance of load
$\omega_0$: $2\pi f_0$ A broken line in FIG. 17 indicates a voltage drop caused by resistance $R_L$ of the load.

A broken line in FIG. 18 indicates input signal $V_1^*$ of the PWM controller of the first inverter. $V_1^* = 0$ is established for $f_0 \leq f_{min}$, and $V_1^*$ is proportional to $f_0$ in a region of $f_0 > f_{min}$. A solid line in FIG. 18 indicates input signal $V_2^*$ of the PWM controller of the second inverter. Signal $V_2^*$ is controlled to output voltage $V_L$ given by equation (1) for $f_0 < f_{min}$, and $V_2^* = I_L^* \cdot R_L =$ constant in a region of $f_0 > f_{min}$.

In this manner, in the conventional power converter, the second inverter need only generate required voltage $V_L$ up to minimum frequency $f_{min}$ at which the output transformer can be operated, and can have a smaller capacity than the first inverter. Since the first inverter generates voltage $V_{L1}$ through output transformer, serial or parallel multiplexed operations of this inverter can be easily performed, and its capacity can be easily increased. Therefore, the converter is convenient for one for driving a large-capacity AC motor.

According to the above conventional power converter, when output frequency $f_0$ becomes high and load current $I_L$ is to be controlled by the first inverter, the following problems are posed.

In general, secondary voltage $V_{L1}$ of the output transformer is proportional to output voltage $V_1$ of the first inverter. However, when a DC component is included in load current $I_L$ due to, e.g., drift of the current detector the output transformer gradually suffers from DC polarized magnetization, and soon, its iron core is magnetically saturated to one side. As a result, secondary voltage $V_{L1}$ of the output transformer is decreased, and load current $I_L$ is decreased to be lower than instruction value $I_L^*$. Then, the inverter operates to increase voltage $V_1$ and further saturate the iron core. Therefore, primary current $I_1$ of the output transformer is abruptly increased, and may become an overcurrent to destroy elements of the first inverter. In order to prevent polarized magnetization of the output transformer, the sectional area of the iron core may be increased and an air gap is provided. In this case, the weight and dimensions of the output transformer are increased, resulting in an uneconomical system.

SUMMARY OF THE INVENTION

The present invention has been made in consideration of the above situation, and has as its object to provide a power converter which can correct polarized magnetization of an output transformer, and can accurately control a load current, and a method of controlling the same.

In order to achieve the above object, according to the present invention, there is provided a power converter which supplies an AC load with a sum of an output voltage from a first PWM inverter having an output transformer, and an output voltage from a second PWM inverter having no output transformer, wherein the first PWM inverter comprises a means for controlling a primary current or an exciting current of the output transformer connected to the first PWM inverter, and a means for controlling a current supplied to the AC load.

The second PWM inverter controls a current to be supplied to the load regardless of output frequency $f_0$.

The first PWM inverter can be constituted by one or a plurality of PWM inverters. Each inverter controls a primary current or an exciting current of a corresponding output transformer. An instruction value of the primary current of the transformer is given by a sum of an instruction value of the load current control, and an instruction value of the exciting current of the transformer. When the instruction value of the exciting current is given to have an almost constant effective value, the output voltage of each output transformer is increased/decreased almost in proportion to the output frequency. A sum of the output voltages of the transformers and the output voltage of the second PWM inverter is applied to the AC load, and the output voltage of the second PWM inverter is adjusted to control the load current. As a result, the first PWM inverter bears a voltage proportional to the output frequency, i.e., a voltage drop caused by a counter electromotive force (velocity electromotive force) and an inductance, and the second PWM inverter bears the remaining necessary voltage, i.e., a voltage drop caused by a resistance of the load and a transient voltage upon load current control. The capacity of the second PWM inverter can be considerably smaller than that of the first PWM inverter.

When the exciting current of each output transformer is controlled to be almost constant, the output voltage of the transformer is increased/decreased in proportional to the output frequency, and an iron core is never saturated even if the frequency is lowered. Even when a DC component is included in an output voltage due to a variation of switching characteristics of self extinction elements constituting the first PWM inverter, and this causes DC polarized magnetization of the output transformers, since the exciting current of each transformer is controlled by the inverter, the DC voltage component can be automatically compensated for, and the transformers can always be operated in a state free from polarized magnetization. Therefore, the primary current of each transformer can be prevented from being increased too much, and elements can also be prevented from being destroyed by polarized magnetization of the transformers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2D are timing charts for explaining a PWM control operation of the converter shown in FIG. 1;

FIG. 7 is a circuit diagram showing still another embodiment of a power converter according to the present invention;

FIGS. 9 and 11 are partial circuit diagrams of the converter shown in FIG. 7;

FIGS. 10A-10D and FIGS. 12A-12B are timing charts for explaining the operation of the converter shown in FIG. 7;

FIGS. 14A-14N are timing charts for explaining the operation of the controller shown in FIG. 13;

FIGS. 16A-16H are timing charts for explaining a control method of the present invention.

DETAILED DESCRIPTION OF THE PREFERRED EMBODIMENTS

Figure 1:
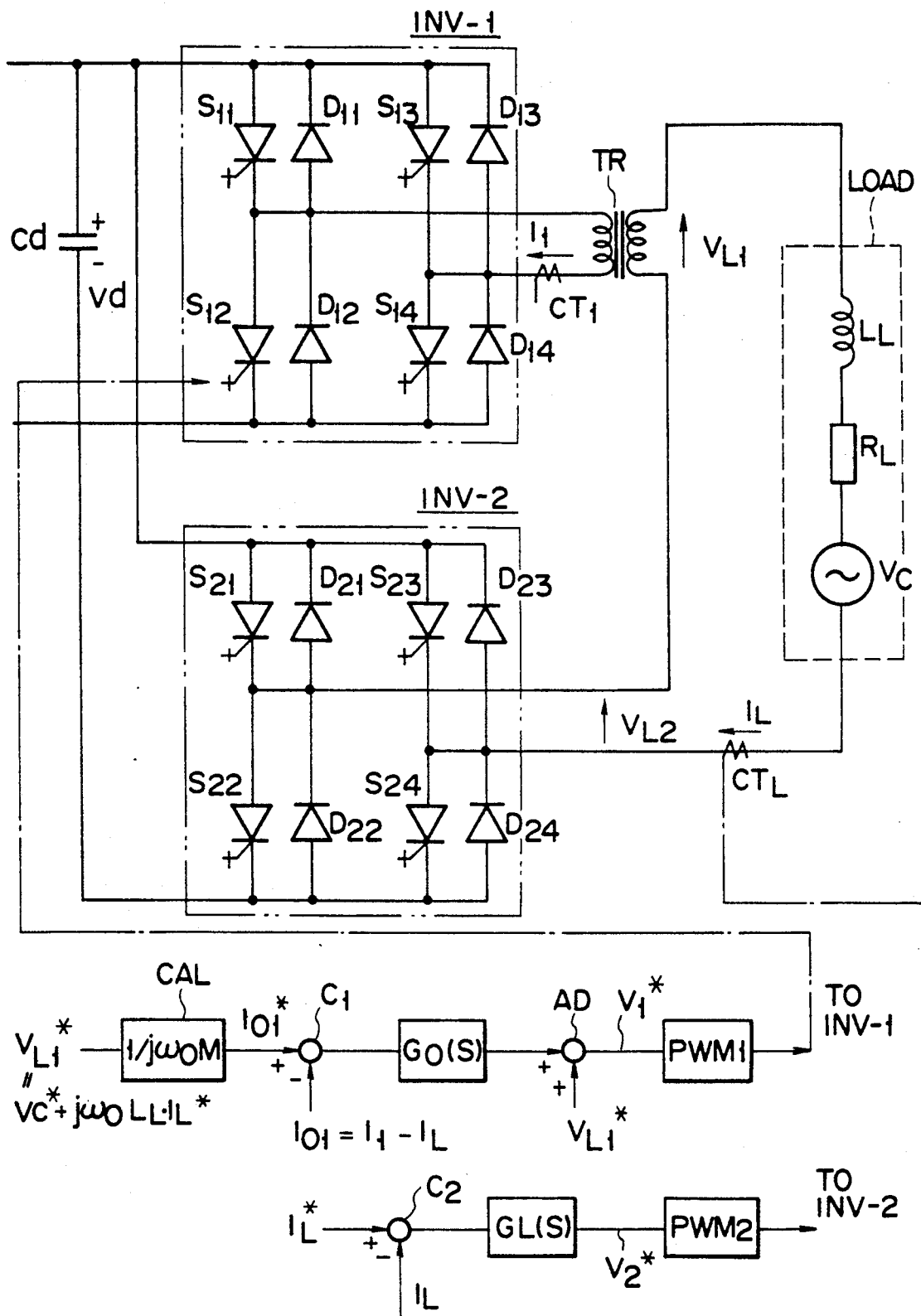
FIG. 1 is a circuit diagram showing an embodiment of a power converter according to the present invention.

FIG. 1 is a circuit diagram showing an embodiment of a power converter according to the present invention.

In FIG. 1, reference symbol $C_d$ denotes a DC smoothing capacitor serving as a DC voltage source; INV-1, a first PWM inverter; INV-2, a second PWM inverter; and LOAD, a AC load.

First PWM inverter INV-1 is a so-called voltage type PWM inverter, and comprises self-extinction elements (e.g., gate turn-off thyristors, and the like) $S_{11}$ to $S_{14}$, and diodes $D_{11}$ to $D_{14}$.

Second PWM inverter INV-2 is also a voltage type PWM inverter, and comprises self-extinction elements S21 to S24 and diodes D21 to D24.

AC load LOAD includes inductance $L_L$, resistance $R_L$, and counter electromotive force $V_C$.

As a controller, current detectors $CT_1$ and $CT_L$, calculation circuit CAL, comparators $C_1$ and $C_2$, current control/compensation circuits G0(S) and $G_L$(S), adder AD, and PWM controllers $PWM_1$ and $PWM_2$ are included.

The PWM control operation of first PWM inverter INV-1 will be briefly described below.

FIGS. 2A to 2D are timing charts for explaining the PWM control operation of the converter shown in FIG. 1. In FIG. 2A, reference symbols X and Y denote PWM control carrier signals, and Y is an inverted value of X (in other words, having a 180° phase difference). $V_1^*$ denotes an input signal of PWM controller $PWM_1$ of first PWM inverter INV-1. Upon comparison between $V_1^*$ and carrier signals X and Y, gate signals $g_{11}$ and $g_{22}$ for elements $S_{11}$ to $S_{14}$ constituting first inverter INV-1 are generated. More specifically, When $V_1^* \geq X$, $g_{11}=$"1", and $S_{11}$: ON, $S_{12}$: OFF When $V_1^* < X$, $g_{11}=$"0", and $S_{11}$: OFF, $S_{12}$: ON When $V_1^* \geq Y$, $g_{12}=$"1", and $S_{13}$: OFF, $S_{14}$: ON When $V_1^* < Y$, $g_{12}=$"0", and $S_{13}$: ON, $S_{14}$: OFF When the voltage of smoothing capacitor $C_d$ is given by $V_d$, output voltage $V_1$ of first inverter INV-1 is given by:

$V_1 = +V_d$ when $S_{11}$ and $S_{14}$ are ON $V_1 = -V_d$ when $S_{12}$ and $S_{13}$ are ON $V_1 = 0$ in other modes More specifically, when the phases of carrier signal X for determining a firing signal of elements $S_{11}$ and $S_{12}$, and carrier signal Y for determining a firing signal of elements $S_{13}$ and $S_{14}$ are shifted by 180°, output voltage $V_1^*$ of first PWM inverter INV-1 has a waveform controlled by a frequency twice a switching frequency of the elements. Average value $\overline{V}_1$ (indicated by broken lines) of the waveform of $V_1$ is proportional to input signal $V_1^*$ of $PWM_1$.

The PWM control operation of second PWM inverter INV-2 is similarly executed.

A load current control operation will be described below.

Load current $I_L$ is controlled by second PWM inverter INV-2.

First, current $I_L$ supplied to load LOAD is detected by current detector $CT_L$, and the detected current is input to comparator $C_2$. Comparator $C_2$ compares load current instruction value $I_L^*$ with detected value $I_L$, and supplies its deviation $\epsilon_L = I_L^* - I_L$ to the next current control/compensation circuit $G_L(S)$. Circuit $G_L(S)$ amplifies deviation $\epsilon_L$, and supplies $V_2^* = G_L(S)\cdot\epsilon_L$ to PWM controller $PWM_2$ of the second inverter. Second inverter INV-2 generates voltage $V_{L2}$ proportional to input voltage $V_2^*$ of the PWM controller.

When $I_L^* > I_L$, deviation $\epsilon_L$ becomes a positive value, and increases input signal $V_2^*$ of $PWM_2$. Thus, control is made so that output voltage $V_{L2}$ of second inverter INV-2 is increased and load current $I_L$ is increased to establish $I_L \approx I_L^*$. Contrary to this, when $I_L^* < I_L$, deviation $\epsilon_L$ becomes a negative value, and decreases output voltage $V_{L2}$ of second inverter INV-2 and load current $I_L$. In this case, control is balanced when $I_L \approx I_L^*$. When load current instruction value $I_L^*$ is sinusoidally changed, actual load current $I_L$ is sinusoidally controlled to follow the change. When output frequency $f_0$ is zero, load current control can be performed without any problem.

The control operation of first PWM inverter INV-1 will be described below.

First PWM inverter INV-1 generates voltage $V_{L1}$ almost proportional to output frequency $f_0$ through output transformer TR. Inverter INV-1 is basically not related to load current control. First PWM inverter INV-1 controls exciting current $I_{01}$ of output transformer TR.

Voltage $V_L$ applied to load LOAD is expressed by:

$$\begin{aligned} V_L &= V_{L1} + V_{L2} \\ &= V_C + R_L \cdot I_L + I_L \cdot p \cdot I_L \end{aligned} \quad (2)$$

p: differential operator

When load current $I_L$ is sinusoidally controlled as follow:

$$I_L = I_{Lm}\cdot\sin\omega_0 t \quad (3)$$

$I_{Lm}$: current peak value
$\omega_0 = 2\pi f_0$ equation (2) is rewritten as:

$$V_L = V_C + R_L \cdot I_L + j\omega_0 L_L \cdot I_L \quad (4)$$

and, coincides with equation (1).

First PWM converter INV-1 generates a component proportional to output frequency $f_0$ in equation (4), and given by:

$$V_{L1} = V_C + j\omega_0 L_L I_L \quad (5)$$

where $V_C$ is the counter electromotive force of an AC motor, and is proportional to a rotational speed of the motor, i.e., output frequency $f_0$ of the inverter.

In order to cause first PWM inverter INV-1 to generate voltage $V_{L1}$ given by equation (5), an instruction value given by the following equation is input to PWM controller $PWM_1$ through adder AD:

$$V_{L1}^* = V_C^* + j\omega_0 \cdot L_L \cdot I_L^* \quad (6)$$

When the ratio of the numbers of turns of the primary winding to secondary winding of output transformer TR is 1:1, output voltage $V_1$ of first PWM inverter INV-1 is directly output from output transformer TR as $V_{L1}$ in a normal operation mode, and becomes a voltage complementary to a sum of counter electromotive force $V_C$ of the motor and voltage drop $j\omega_0 L_L I_L$ by inductance $L_L$. As a result, second PWM inverter INV-2 need only generate output voltage $V_{L2}$ corresponding to voltage drop $I_L \cdot R_L$ caused by resistance $R_L$, and load current $I_L$ can also be easily controlled.

However, when output transformer TR suffers from DC polarized magnetization, an iron core may be saturated, and an exciting current of transformer TR may become too high. In order to prevent this, the first PWM inverter controls exciting current $I_{01}$. The control operation of the exiting current will be described below.

Primary current $I_1$ and secondary current (load current) $I_L$ are respectively detected by current detectors $CT_1$ and $CT_L$, and a difference between the two currents is calculated to obtain exciting current $I_{01}$ of the transformer. That is, $$I_{01} = I_1 - I_L \quad (7)$$

In this case, the ratio of the numbers of turns of the primary and secondary windings of transformer TR is assumed to be 1.

On the other hand, exciting current instruction value $I_{01}^*$ is obtained by the following calculation by calculation circuit CAL using the above-mentioned output voltage instruction value $V_{L1}^*$.

$$\begin{aligned} I_{01}^* &= \frac{V_{L1}^*}{j\omega_0 M} \\ &= \frac{V_C^*}{j\omega_0 M} + \frac{L_L}{M}\cdot I_L^* \end{aligned} \quad (8)$$

where M is the exciting inductance of the transformer.

In a synchronous motor load, when load current $I_L$ is sinusoidally controlled to be in phase with counter electromotive force $V_C$, $V_C^*$ and $I_L^*$ are respectively given by:

$$V_C^* = V_{Cm}^*\cdot\sin\omega_0 t \quad (9)$$

$$I_L^* = I_{Lm}^*\cdot\sin\omega_0 t \quad (10)$$

$V_{Cm}^*$: voltage peak instruction value
$I_{Lm}^*$: current peak instruction value Thus, exciting current instruction value $I01^*$ given by equation (8) is expressed by:

$$I_{01}^* = \frac{V_{Cm}^*}{\omega_0 M}\cdot\sin\left(\omega_0 t - \frac{\pi}{2}\right) + \frac{L_L}{M}\cdot I_{Lm}^*\cdot\sin(\omega_0 t) \quad (11)$$

Figure 3:
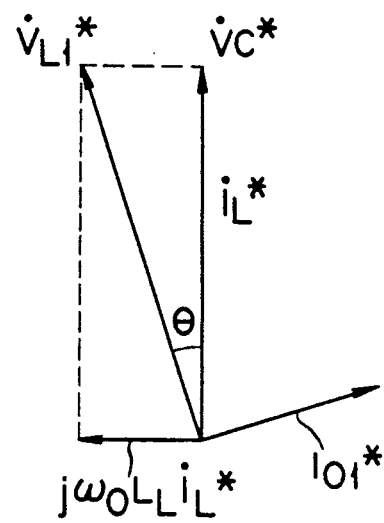
FIG. 3 is a vector chart for explaining the operation of the converter shown in FIG. 1.

FIG. 3 is a vector chart of these values. More specifically, vector $V_{L1}^*$ of the secondary voltage of output transformer TR is equal to a sum of counter electromotive force vector $V_C^*$ and vector $j\omega_0 L_L I_L^*$ of a voltage drop caused by inductance $L_L$ of the load, and hence, exciting current $I_{01}^*$ is necessary for generating secondary voltage $V_{L1}^*$.

Comparator $C_1$ compares exciting current instruction value $I_{01}^*$ with detection value I, and deviation $\epsilon_{01} = I_{01}^* - I_{01}$ therebetween is amplified by the next current control/compensation circuit $G_0(S)$. The output signal of $G_0(S)$ is added to output voltage instruction value $V_{L1}^*$ by adder AD, and $V_1^* = V_{L1}^* + G_0(S) \cdot \epsilon_{01}$ is input to PWM controller $PWM_1$ of first PWM inverter INV-1.

When $I_{01}^* > I_{01}$, deviation $\epsilon_{01}$ becomes a positive value, and is amplified by $G_0(S)$, thus increasing input signal $V_1^*$ of $PWM_1$. Therefore, output voltage $V_1$ of the first inverter is increased, and exciting voltage of the transformer is increased. In this case, although secondary voltage $V_{L1}$ of output transformer TR is also slightly increased, output voltage $V_{L2}$ of second inverter INV-2 which performs load current control is decreased by a value corresponding to an increase in $V_{L1}$, and voltage $V_L = V_{L1} + V_{L2}$ to be applied to load LOAD is left unchanged. Therefore, control is balanced to yield $I_{01} \approx I_{01}^*$.

In contrast to this, when $I_{01}^* < I_{01}$, deviation $\epsilon 01$ becomes a negative value, and decreases output voltage $V_1$ of first inverter INV-1 and exciting current $I_{01}$ of transformer TR. Thus, control is balanced when $I_{01} \approx I_{01}^*$. In this case, load current $I_L$ is also controlled by second inverter INV-2 to satisfy $I_L \approx I_L^*$.

When exciting current instruction value $I_{01}^*$ is sinusoidally changed, as expressed by equation (11), actual exciting current $I_{01}$ is sinusoidally controlled to follow it.

In equation (11), since peak value $V_{Cm}^*$ of the counter electromotive force is proportional to output frequency $\omega_0$, when peak value $I_{Lm}^*$ of the load current is constant, the peak value of exciting current $I_{01}^*$ becomes constant regardless of output frequency $f_0$.

In the vector chart of FIG. 3, when load current instruction value $I_L^*$ is increased, inductance drop $j\omega_0 L_L I_L^*$ of the load is increased accordingly, and secondary voltage $V_{L1}^*$ of output transformer TR is also increased. As a result, the magnitude of exciting current vector $I_{01}^*$ is also increased.

Figure 4:
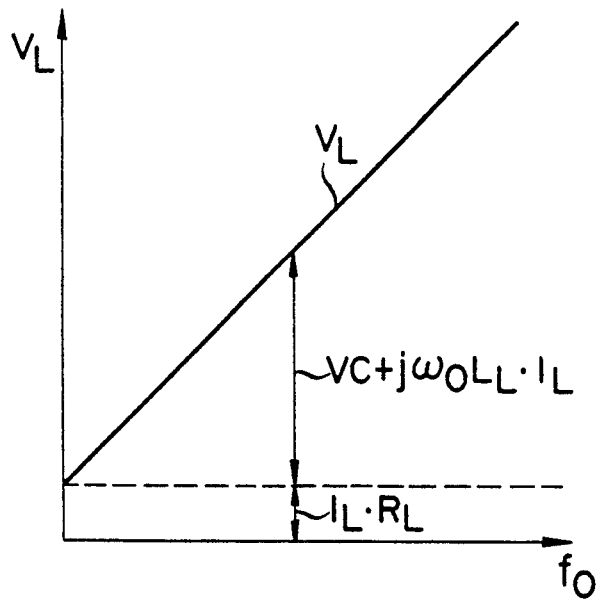
FIGS. 4 and 5 are graphs showing frequency-voltage characteristics for explaining the operation of the converter shown in FIG. 1.

FIG. 4 shows the relationship between output frequency $f_0$ and the magnitude of load terminal voltage $V_L$. First PWM inverter INV-1 bears component $V_C + j\omega_0 L_L I_L$ proportional to output frequency $f_0$, and second PWM inverter INV-2 bears voltage drop $I_L \cdot R_L$ by the resistance.

Figure 5:
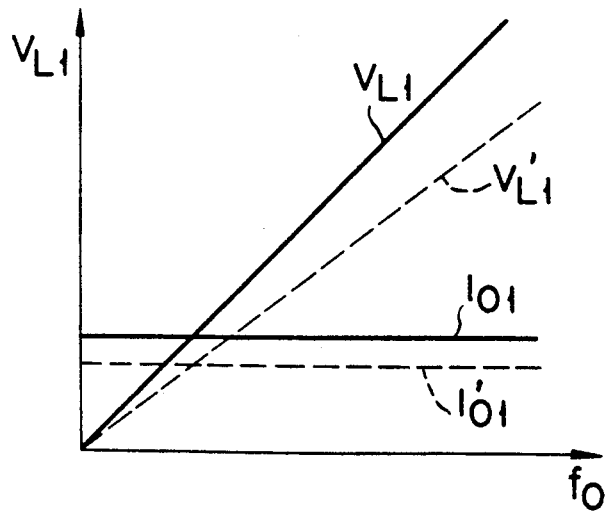

FIG. 5 shows the relationship between secondary voltage $V_{L1}$ of output transformer TR of first PWM inverter INV-1 and output frequency $f_0$. When exciting current $I_{01}$ of the transformer is assumed to be constant, the magnitude of secondary voltage $V_{L1}$ is proportional to output frequency $f_0$. When excitation current $I_{01}$ is decreased like $I'_{01}$, the magnitude of $V_{L1}$ is also decreased as indicated by a broken line.

A case will be considered below wherein a DC component is superposed on load current $I_L$ due to, e.g., drift of current detector $CT_L$ in the converter shown in FIG. 1, and output transformer TR suffers from DC polarized magnetization. Due to the DC polarized magnetization, the iron core of transformer TR is saturated to one side. For this reason, mutual inductance M of transformer TR is decreased, and causes exciting current $I_{01}$ to increase. However, in the converter of the present invention, since first PWM inverter INV-1 controls exciting current $I_{01}$ of transformer TR to coincide with instruction value $I_{01}^*$, output voltage $V_1$ of first inverter INV-1 is automatically decreased, and an increase in exciting current $I_{01}$ is prevented. As a result, primary current $I_1$ of transformer TR, i.e., the output current of inverter INV-1 is no longer increased. As a result, elements can be prevented from being destroyed by an overcurrent caused by polarized magnetization as a conventional problem.

Figure 6:
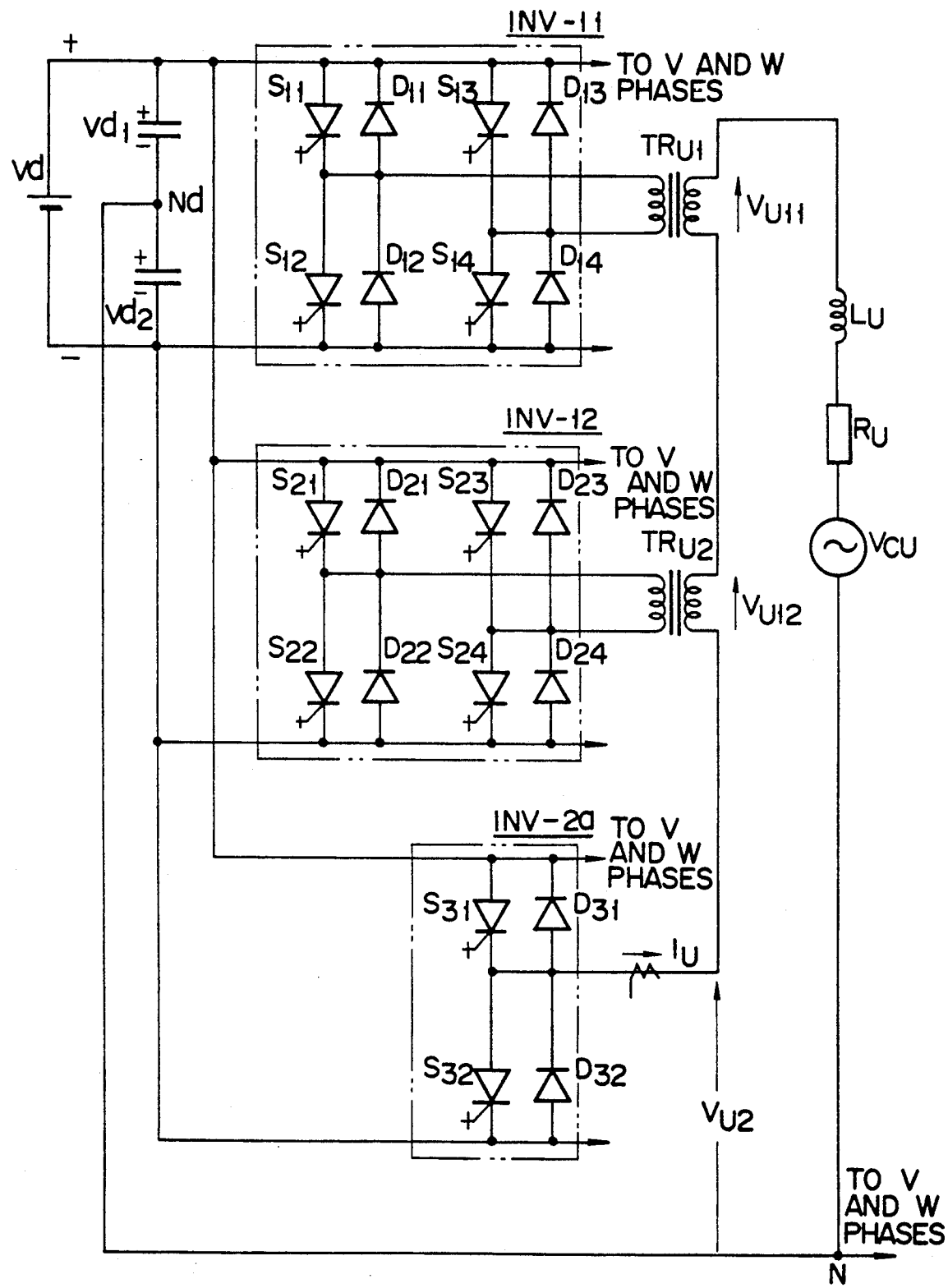
FIG. 6 is a circuit diagram showing another embodiment of a power converter according to the present invention.

FIG. 6 is a circuit diagram showing another embodiment of a power converter according to the present invention. A difference from the converter shown in FIG. 1 will be described below.

More specifically, two stages of inverters INV-11 and INV-12 having output transformers are stacked and multiplexed, and direct-connection inverter (having no output transformer) INV-2a bridge-connects three phases. Neutral point N of a load is connected to an intermediate tap of DC voltage $V_d$.

In this manner, the number of multiplexed stages of inverters having output transformers can be increased to increase an output capacity of the power converter. Since neutral point N of the load is connected to the intermediate tap of DC voltage $V_d$, an electrical power can be supplied to a three-phase, four-line type load.

In the converter shown in FIG. 7, load current $I_L$ can be controlled by direct-connection inverter INV-2, and exciting currents of corresponding output transformers $TR_{U1}$ and $TR_{U2}$ can be respectively controlled by inverters INV-11 and INV-12 with the output transformers. Thus, the same effect as in the converter shown in FIG. 1 can be provided.

According to the power converter of the present invention, even when DC polarized magnetization occurs in an output transformer, the primary current (output current of the first PWM inverter) of the transformer is prevented from being increased, and elements can be prevented from being destroyed by an overcurrent.

Figure 8:
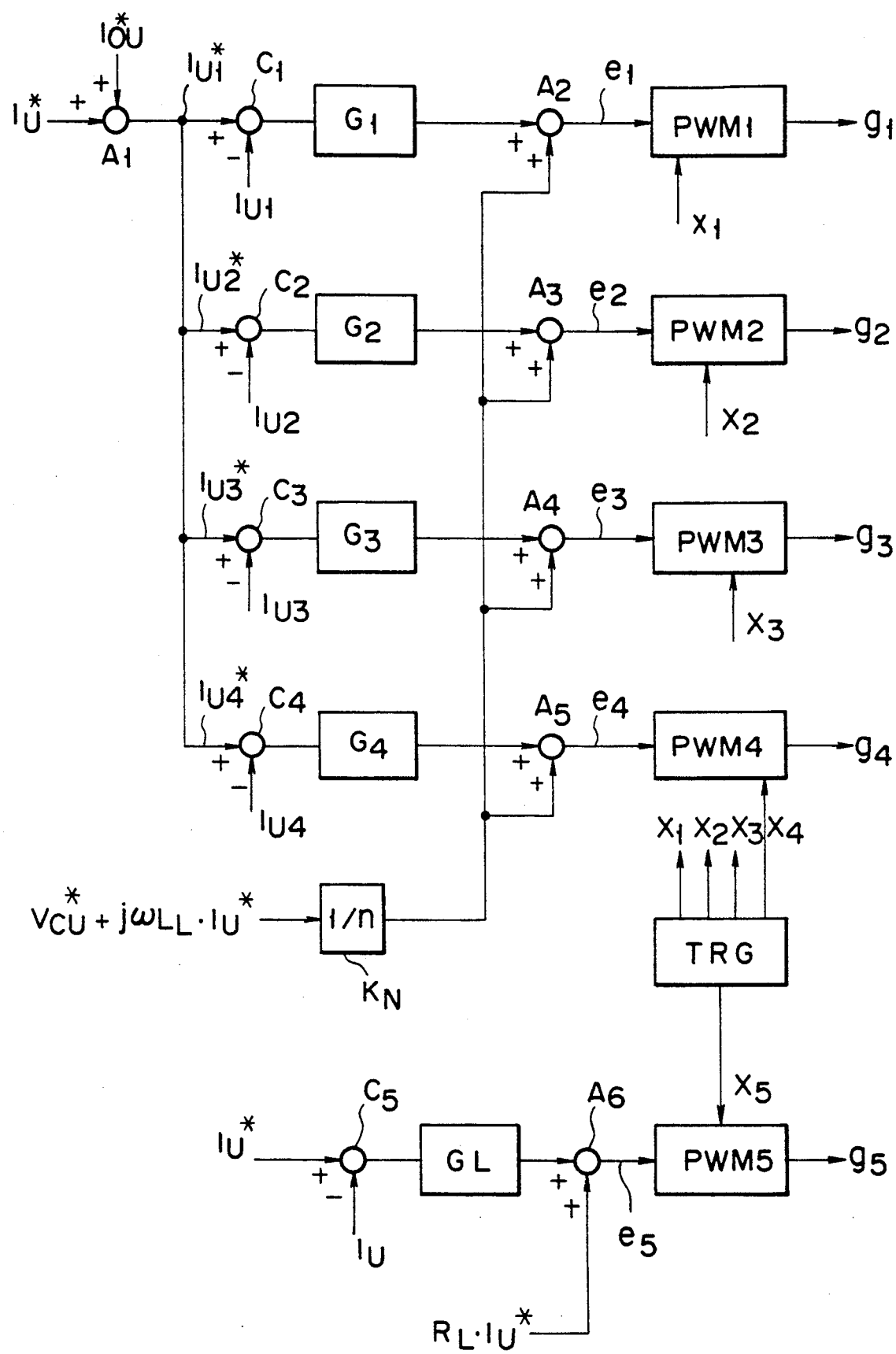
FIG. 8 is a circuit diagram of a controller for the converter shown in FIG. 7.

FIG. 7 is a circuit diagram showing still another embodiment of a power converter according to the present invention, and FIG. 8 is a circuit diagram showing an embodiment of a controller of the converter shown in FIG. 7.

In FIG. 7, reference symbol $V_d$ denotes a DC voltage source; INV-1 to INV-4, multiplexed PWM inverters; INV-5, a direct-connection PWM inverter; $TR_1$ to $TR_4$, output transformers; and LOAD, an AC load (U phase). FIG. 7 illustrates a circuit corresponding to only one output phase of the converter. However, circuits corresponding to V and W phases have the same arrangements.

In FIG. 8, reference numerals $A_1$ to $A_6$ denote adders; $C_1$ to $C_5$, comparators; $G_1$ to $G_4$ and $G_L$, current control/compensation circuits; $K_N$, an operational amplifier; $PWM_1$ to $PWM_5$, PWM controllers; and TRG, a carrier (triangular wave) generator. Note that $CT_1$ to $CT_5$ in FIG. 7 designate current detectors.

FIG. 9 shows a detailed arrangement of PWM inverter INV-1 shown in FIG. 7. Inverter INV-1 comprises self-extinction elements $S_{11}$ to $S_{14}$ and free-wheeling diodes $D_{11}$ to $D_{14}$.

FIGS. 10A to 10D are timing charts for explaining the PWM control operation of the inverters shown in FIG. 9.

Reference numerals $X_1$ and $Y_1$ denote PWM control carrier signals. $Y_1$ has an inverted value (or a signal having a phase difference of 180°) of $X_1$. Control input signals $e_1$ and $X_1$ are compared to generate gate signal $g_1$ for elements $S_{11}$ and $S_{12}$ of inverter INV-1.

When $e_1 \geq X_1$, $g_1 = 1$, and $S_{11}$: ON, $S_{12}$: OFF

When $e_1 < X_1$, $g_1 = 0$, and $S_{11}$: OFF, $S_{12}$: ON

Control input signals $e_1$ and $Y_1$ are compared to generate gate signal $g_1'$ for elements $S_{13}$ and $S_{14}$.

When $e_1 \geq Y_1$, $g_1' = 1$, and $S_{13}$: OFF, $S_{14}$: ON

When $e_1 < Y_1$, $g_1' = 0$, and $S_{13}$: ON, $S_{14}$: OFF

When the ratio of the numbers of turns of primary to secondary windings is assumed to be 1, output voltage $V_1$ of inverter INV-1 is given by:

$V_1 = +V_d$ when $S_{11}$ and $S_{14}$ are ON $V_1 = -V_d$ when $S_{12}$ and $S_{13}$ are ON $V_1 = 0$ in other modes Thus, a waveform shown in FIG. 10D is obtained. Average value $\overline{V}_1$ (indicated by a broken curve) is proportional to control input signal $e_1$.

In this manner, output voltage $V_1$ of inverter INV-1 is controlled by a frequency twice the PWM control carrier frequency.

The three remaining PWM inverters INV-2 to INV-4 are similarly controlled. In this case, carrier signals $X_2$ to $X_4$ have a phase difference of 45° (electrical angle) from each other ($Y_2$ to $Y_4$ are inverted values of $X_2$ to $X_4$, respectively). As a result, a sum $V_1 + V_2 + V_3 + V_4$ of voltages generated through output transformers $TR_1$ to $TR_4$ becomes a multiplexed voltage, and has a voltage waveform controlled by $8 \cdot f_C$ with respect to PWM control carrier frequency $f_C$. A lower-order harmonic component upon PWM control is canceled, and only a higher-order harmonic component appears in output voltage $V_1 + V_2 + V_3 + V_4$. This higher-order harmonic component can be easily canceled by a filter, e.g., a reactor.

Figure 11:
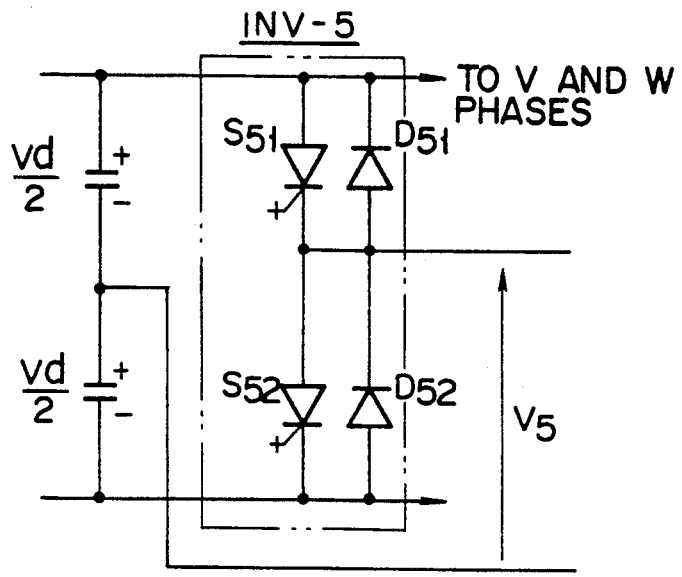

Direct-connection inverter INV-5 has an arrangement as shown in FIG. 11. FIG. 11 shows a circuit corresponding to a U phase of a three-phase Graetz connection, which comprises self-extinction elements $S_{51}$ and $S_{52}$ and free-wheeling diodes $D_{51}$ and $D_{52}$. A neutral line of a load is connected to an intermediate line of DC voltage $V_d$.

Figure 12A:
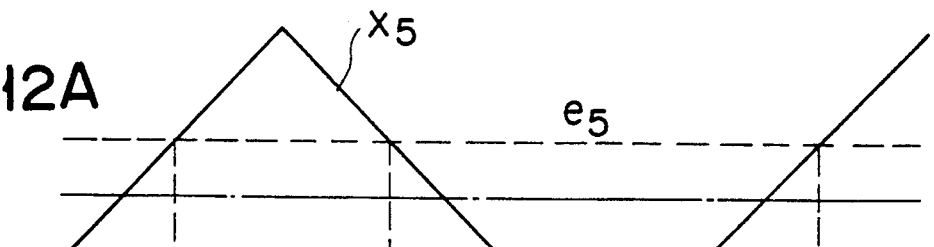
Figure 12B:
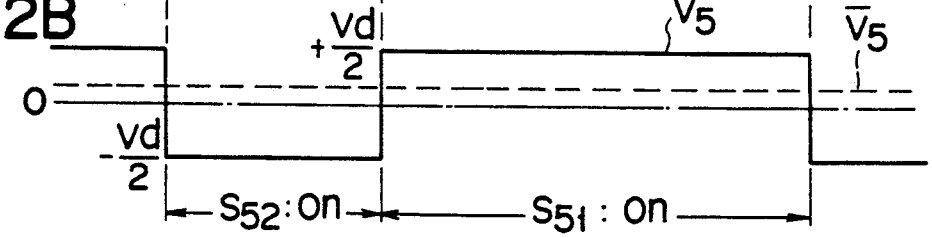

FIGS. 12A and 12B are timing charts for explaining the PWM control operation of inverter INV-5. Carrier signal $X_5$ and control input signal $e_5$ are compared to generate gate signal $g_5$ for elements $S_{51}$ and $S_{52}$.

When $e_5 \geq X_5$, $g_5 = 1$, and $S_{51}$: ON, $S_{52}$: OFF

When $e_5 < X_5$, $g_5 = -1$, and $S_{51}$: OFF, $S_{52}$: ON

Output voltage $V_5$ of inverter INV-5 is given by:

$V_5 = +(V_d/2)$ when $S_{51}$ is ON $V_5 = -(V_d/2)$ when $S_{52}$ is ON

Average value $\overline{V}_5$ is proportional to control input signal $e_5$. In this manner, output voltage $V_5$ of direct-connection inverter INV-5 is controlled by the PWM control carrier frequency.

The control operation of the converter of the present invention will be described below with reference to FIGS. 7 to 12.

Load current $I_U$ is controlled by direct-connection inverter INV-5.

More specifically, load current $I_U$ is detected by current detector $CT_5$, and the detected current is input to comparator $C_5$. Comparator $C_5$ compares load current instruction value $I_U^*$ with detected value $I_U$ to obtain deviation $\epsilon_U = I_U^* - I_U$. Deviation $\epsilon_U$ is amplified by the next current control/compensation circuit $G_L$, and the amplified deviation is supplied, as input signal $e_5$, to PWM controller $PWM_5$ of direct-connection inverter INV-5 through adder $A_6$. Direct-connection inverter INV-5 generates voltage $\overline{V}_5$ proportional to input signal $e_5$, as described above.

When $I_U^* > I_U$, deviation $\epsilon_U$ has a positive value, and increases output voltage $V_5$ of direct-connection inverter INV-5, thus increasing load current $I_U$ so to establish $I_U = I_U^*$. In contrast to this, when $I_U^* < I_U$, deviation $\epsilon_U$ has a negative value, and decreases output voltage $V_5$, thus decreasing load current $I_U$. Thus, the load current is balanced when $I_U = I_U^*$. When current instruction value $I_U^*$ is sinusoidally changed, actual current $I_U$ is sinusoidally controlled to follow the change.

Direct-connection inverter INV-5 basically generates voltage $R_L \cdot I_U$ corresponding to a voltage drop caused by resistance $R_L$ of the load. Thus, adder $A_6$ receives a signal obtained by multiplying load resistance $R_L$ with current instruction value $I_U^*$. Input signal $e_5$ to $PWM_5$ is given by:

$$e_5 = R_L \cdot I_U^* + \epsilon_U \cdot G_L \tag{12A}$$

More specifically, direct-connection inverter INV-5 always generates a voltage corresponding to a voltage drop caused by the load resistance, and additionally generates a voltage according to current deviation $\epsilon_U$ to control the load current. Since a voltage drop caused by the resistance does not depend on output frequency $f_0$, when $f_0 = 0$, multiplexed inverters INV-1 to INV-4 having output transformers cannot generate a voltage, and a voltage must be supplied from the direct-connection inverter.

Multiplexed PWM inverters INV-1 to INV-4 generate voltages proportional to output frequency $f_0$.

More specifically, for a motor load, these inverters supply a voltage corresponding to a sum of a voltage of counter electromotive force $V_{CU}$ and voltage drop $j\omega L_L \cdot I_U$ caused by inductance $L_L$ of the load.

In FIG. 8, compensation signal $V_{CU}^* + j\omega L_L \cdot I_U^*$ obtained by counter electromotive force compensation value $V_{CU}^*$ and load current instruction value $I_U^*$ is input to operational amplifier $K_N$ and adder $A_2$ to supply input signal $e_1$ to PWM controller $PWM_1$ of inverter INV-1. Similarly, input signals $e_2$ to $e_4$ are input to controllers $PWM_2$ to $PWM_4$. For the sake of simplicity, if other signals are assumed to be zero, $$\begin{aligned} e_1 &= e_2 = e_3 = e_4 \\ &= (V_{CU}^* + j\omega L_L \cdot I_U^*)/n \\ &= 2\pi \cdot f_0, n = 4 \end{aligned} \tag{12B}$$

where n is the number of stages of inverters constituting a multiplexed inverter, and n = 4 in this case.

As a result, output voltage $V_1+V_2+V_3+V_4$ of the multiplexed inverter is proportional to the sum of input signals $e_1$ to $e_4$, and a voltage proportional to $V_{CU}^*+j\omega L_L I_U^*$ is generated. Counter electromotive force $V_{CU}^*$ is proportional to output frequency $f_0$, and second term $j\omega L_L I_U^*$ is also proportional to output frequency $f_O$ second term $j\omega L_L I_U^*$. Therefore, output voltage $V_1+V_2+V_3+V_4$ of the multiplexed inverter is proportional to output frequency $f_0$, and effective values of exciting currents $IOU_1$ to $IOU_4$ of output transformers $TR_1$ to $TR_4$ become almost constant.

In practice, however, a DC bias or the like may be slightly applied to the output transformers due to drift of the controller or unbalanced switching characteristics of elements. When a DC bias voltage is applied to a transformer, the transformer gradually undergoes polarized magnetization, and finally, its iron core is saturated, so that an excessive exciting current flows through the transformer. As a result, not only the transformer is burnt, but also elements constituting the inverter are destroyed by an overcurrent.

In the converter of the present invention, four inverters INV-1 to INV-4 constituting the multiplexed PWM inverter respectively control primary currents $I_{U1}$ to $I_{U4}$ of their output transformers. The control operation of primary current $I_{U1}$ of inverter INV-1 will be described below.

Current detector $CT_1$ detects primary current $I_{U1}$ of transformer $TR_1$, and the detected current is input to comparator $C_1$. Comparator $C_1$ compares primary current instruction value $I_{U1}^*$ with current detection value $I_{U1}$ to obtain deviation $\epsilon_1 = I_{U1}^* - I_{U1}$. Deviation $\epsilon_1$ is amplified by the next current control/compensation circuit $G_1$, and is then input to adder $A_2$ to supply input signal $e_1$ of PWM controller $PWM_1$. Thus, $e_1$ given by equation (12B) is rewritten as:

$$e_1 = (V_{CU}^* + j\omega L_L \cdot I_U^*)/4 + \epsilon_1 \cdot G_1 \qquad (13)$$

Primary current instruction value $I_{U1}^*$ is given by the sum of load current instruction value $I_U^*$ and instruction value $I_{OU1}^*$ of exciting current $I_{OU1}$ of transformer $TR_1$. If the four transformers have the same capacity and rated value, $I_{OU1}^* = I_{OU2}^* = I_{OU3}^* = I_{OU4}^*$. Therefore, $$\begin{aligned} I_{U1}^* &= I_U^* + I_{OU}^* \\ &= I_{U2}^* = I_{U3}^* = I_{U4}^* \end{aligned} \qquad (14)$$

When $I_{U1}^* > I_{U1}$, deviation $\epsilon_1$ has a positive value, and increases input signal $e_1$ given by equation (13), thus increasing primary current $I_{U1}$ to establish $I_{U1} = I_{U1}^*$. In this case, load current $I_U$ is controlled by direct-connection inverter INV-5 to $I_U \approx I_U^*$. As a result, exciting current $I_{OU1}$ of transformer $TR_1$ is controlled to coincide with instruction value $I_{OU}^*$ described above.

In contrast to this, when $I_{U1}^* < I_{U1}$, deviation $\epsilon_1$ has a negative value, and decreases input signal $e_1$, i.e., the output voltage of inverter INV-1 to satisfy $I_{U1} \approx I_{U1}^*$.

In this manner, primary current $I_{U1}$ of transformer $TR_1$ is controlled to coincide with instruction value $I_{U1}^*$, and exciting current $I_{OU1}$ of transformer $TR_1$ consequently coincides with instruction value $I_{OU}^*$. Even when a DC bias is applied to transformer $TR_1$ due to, e.g., unbalanced characteristics of elements, exciting current $I_{OU1} \approx I_{OU}^*$ is established, and the control system is operated to finally cancel the DC bias.

Other inverters INV-2a to INV-4 are similarly controlled.

As described above, the multiplexed PWM inverter must basically generate a sum voltage of counter electromotive force $V_{CU}$ and voltage drop $j\omega L_L I_U$ caused by inductance $L_L$ of the load. Therefore, exciting currents $I_{OU1}$ to $I_{OU4}$ of transformers $TR_1$ to $TR_4$ must be adjusted to corresponding values. When a mutual inductance upon a rated output of each transformer is represented by M, instruction value $I_{OU}^*$ of the exciting current input to adder $A_1$ is given by:

$$\begin{aligned} I_{OU}^* &= \frac{V_{CU}^* + j\omega L_L \cdot I_U^*}{j\omega M} \cdot \frac{1}{n} \\ &= \left( -j \frac{V_{CU}^*}{\omega M} + \frac{L_L}{M} \cdot I_U^* \right) \cdot \frac{1}{n} \end{aligned} \qquad (15)$$

In this manner, the multiplexed PWM inverter generates a voltage corresponding to counter electromotive force $V_{CU}$ and voltage drop $j\omega L_L I_U$ caused by the inductance of the load, and the direct-connection inverter generates a voltage corresponding to a voltage drop caused by the resistance of the load and a transient voltage necessary for load current control, thereby controlling load current $I_U$ to coincide with its instruction value $I_U^*$. In this case, even when a DC bias voltage is applied to the output transformer due to unbalanced characteristics of elements, since primary current control (in other words, exciting current control) of the transformer is executed, no DC polarized magnetization occurs. Thus, no overcurrent caused by polarized magnetization flows through the transformer, and elements constituting the inverter can be prevented from being destroyed.

However, the power converter shown in FIG. 7 poses the following problems.

That is, output voltage $V_1+V_2+V_3+V_4$ generated by the multiplexed PWM inverter can be a sinusoidal voltage free from distortion. However, since the direct-connection inverter cannot execute multiplexed PWM control, the waveform distortion of its output voltage $V_5$ is increased. In particular, in a region of low output frequencies $f_0$, a current to be supplied to AC load LOAD includes many pulsation components, and causes torque pulsation for a motor load.

If the carrier frequency of direct-connection inverter INV-5 can be increased up to about 8 times those of multiplexed inverters INV-1 to INV-4, the above-mentioned voltage distortion can be decreased, and a balanced power converter as a whole can be realized. However, the switching frequency of a GTO (gate turn-off thyristor) as a typical self-extinction element is at most about 500 Hz, and it is impossible to increase only the carrier frequency of direct-connection inverter INV-5.

As the power converter has higher-voltage, larger-capacity specifications, elements constituting an inverter must be serially connected. In order to reduce a switching loss and snubber circuit loss, a carrier frequency is preferably reduced as much as possible during an operation.

Thus, the present invention also provides a power converter which can always supply a sinusoidal current free from distortion to an AC load regardless of an output frequency level without increasing a carrier frequency of a direct-connection inverter, and a method of controlling the same.

Figure 13:
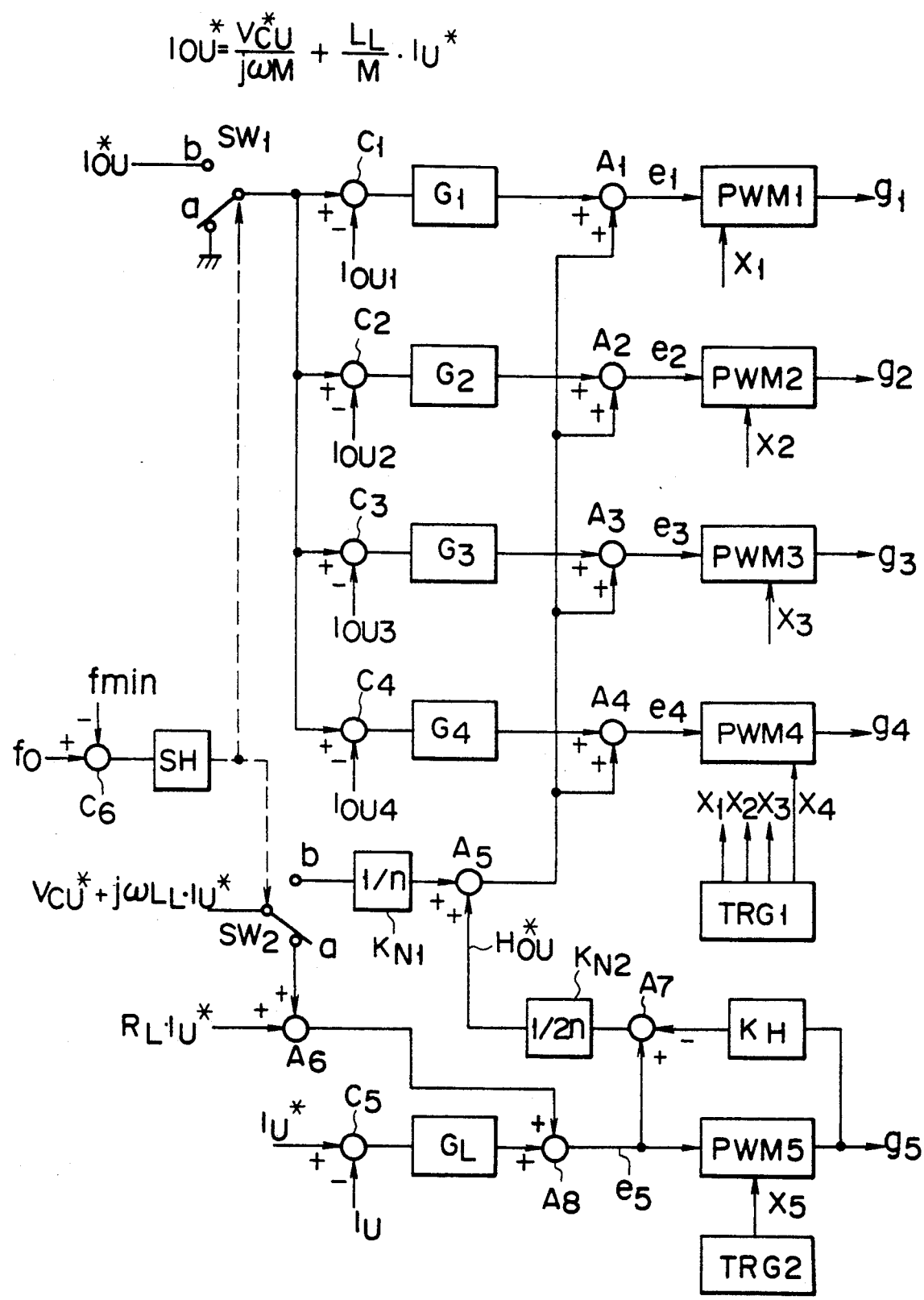
FIG. 13 is a circuit diagram showing another arrangement of the controller for the converter shown in FIG. 7.

FIG. 13 is a circuit diagram showing another embodiment of a controller of the converter according to the present invention.

In FIG. 13, reference numerals $SW_1$ and $SW_2$ denote switch circuits; $C_1$ to $C_6$, comparators; $A_1$ to $A_8$, adders; SH, a Schmitt circuit; $G_1$ to $G_4$ and $G_L$, current control/compensation circuits; $K_{N1}$, $K_{N2}$, and $K_N$, operational amplifiers; $PWM_1$ to $PWM_5$, PWM controllers; and $TRG_1$ and $TRG_2$, carrier generators.

A difference between the embodiment shown in FIG. 13 and the controller shown in FIG. 8 is as follows.

In the controller shown in FIG. 8, four PWM inverters INV-1 to INV-4 constituting the multiplexed inverter control primary currents $I_{U1}$ to $IU_4$ of their output transformers. In this embodiment, these inverters control exciting currents $I_{OU1}$ to $I_{OU4}$ of the transformers. If the four transformers are assumed to have the same capacity and rated value, instruction value $IOU^*$ of its exciting current is given by equation (15). Exciting currents $I_{OU1}$ to $I_{OU4}$ of the transformers can be obtained by calculations from the detection values of primary currents $I_{U1}$ to $I_{U4}$ of the transformers, and the detection value of load current $I_U$ as follows:

$$\left.\begin{array}{l} I_{OU1} = I_{U1} - I_U \\ I_{OU2} = I_{U2} - I_U \\ I_{OU3} = I_{U3} - I_U \\ I_{OU4} = I_{U4} - I_U \end{array}\right\} \quad (16)$$

Comparator $C_1$ compares exciting current detection value $I_{OU1}$ and its instruction value $I_{OU}^*$, and control/compensation circuit $G_1$ amplifies deviation $\epsilon_1 = I_{OU}^* - I_{OU1}$. Inverter INV-1 is controlled under PWM control to satisfy $I_{OU1} \approx I_{OU}^*$. Exciting currents $I_{OU2}$ to $I_{OU4}$ of other transformers are also controlled to coincide with instruction value $I_{OU}^*$. As a result, polarized magnetization of the output transformer can be eliminated, and element destruction can be prevented as in the controller shown in FIG. 8.

The next difference is as follows. That is, when output frequency $f_0$ of the inverter is lower than minimum frequency $f_{min}$ (e.g., $f_{min} = 1$ Hz is selected as a minimum frequency at which the output transformer can be operated), a fundamental wave (output frequency component) voltage generated from the multiplexed PWM inverter is controlled to be zero.

More specifically, comparator $C_6$ compares output frequency $f_0$ and setup value $f_{min}$ of the minimum frequency, and the Schmitt circuit switches the contacts of switch circuits $SW_1$ and $SW_2$. When $f_0 < f_{min}$, circuits $SW_1$ and $SW_2$ are connected to contacts a. Thus, exciting current instruction value $I_{OU}^*$ of the transformer becomes zero, and a voltage of the fundamental wave generated from the multiplexed PWM inverter also becomes zero. When $F_0 > f_{min}$, switch circuits $SW_1$ and $SW_2$ are switched to contacts b, and the multiplexed PWM inverter generates counter electromotive force $V_{CU}$ of the load and voltage drop $j\omega L_L I_U$ caused by the inductance. Meanwhile, when $f_0 < f_{min}$, direct-connection PWM inverter INV-5 bears a total of counter electromotive force $V_{CU}$ of the load, voltage drop $j\omega L_L I_U$ caused by the inductance, and voltage drop $R_L \cdot I_U$ caused by the resistance, and controls load current $I_U$. In this manner, in a region of $f_0 < f_{min}$, output transformers $TR_1$ to $TR_4$ are controlled not to flow wasteful exciting currents.

In the embodiment shown in FIG. 13, compensation control is executed so that a harmonic voltage generated by direct-connection inverter INV-5 is canceled by multiplexed inverters INV-1 to INV-4. More specifically, pulsation component $\Delta V_5$ of voltage $V_5$ generated from inverter INV-5 is predicted from PWM control input signal $e_5$ of direct-connection inverter INV-5 and output signal $g_5$ of PWM controller $PWM_5$, and multiplexed PWM inverters INV-1 to INV-4 are caused to generate its inverted value $-\Delta V_5$.

As has been described with reference to FIGS. 12A and 12B for explaining the PWM control operation of the direct-connection inverter, carrier signal $X_5$ and control input signal $e_5$ are compared to generate gate signal $g_5$. Output voltage $V_5$ is determined as follows.

When $e_5 \geq X_5$, $g_5 = 1$, and $S_{51}$: ON, $S_{52}$: OFF

When $e_5 < X_5$, $g_5 = -1$, and $S_{51}$: OFF, $S_{52}$: ON

Output voltage $V_5$ is separated into fundamental wave component $\overline{V}_5$ and harmonic component $\Delta V_5$. More specifically, $\Delta V_5 = V_5 - \overline{V}_5$. This can be converted to the level of PWM control input signal $e_5$ as follows.

Peak values of carrier signals $X_1$ to $X_5$ are represented by $E_{max}$, and gate signal $g_5$ is multiplied with $E_{max}$ by operational amplifier $K_H$. Output $g_5 \cdot E_{max}$ of amplifier $K_H$ is a voltage proportional to output voltage $V_5$, and input signal $e_5$ proportional to $V_5$ is subtracted from the output:

$$\Delta e_5 = g_5 \cdot E_{max} - e_5 \propto \Delta V_5 \quad (17)$$

The output from adder $A_7$ corresponds to an inverted value of a value given by equation (17), and is multiplied with ($\frac{1}{2}n$) by operational amplifier $K_{N2}$ to obtain compensation control signal $H_{OU}^*$.

$$H_{OU}^* = -(g_5 \cdot E_{max} - e_5)/(2n) \quad (18)$$

where n is the number of series-connected multiplexed inverters, and $n = 4$ in this case. Compensation signal $H_{OU}^*$ is input to controllers $PWM_1$ to $PWM_4$ through adder $A_5$ and adders $A_1$ to $A_4$. In the following description, other signals are assumed to be zero for the sake of simplicity.

Figure 14A:
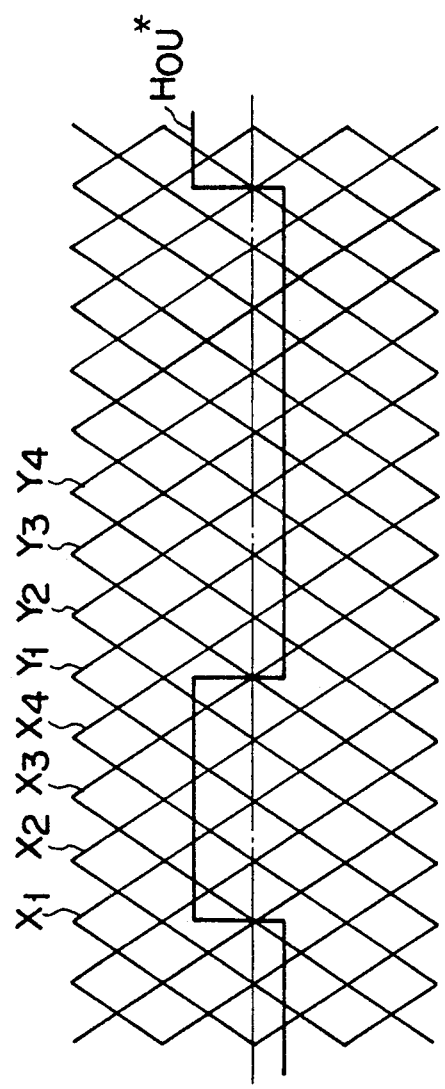

FIGS. 14A to 14N are timing charts for explaining the operation of the multiplexed PWM inverter when $e_1 = e_2 = e_3 = e_4 = H_{OU}^*$.

Reference numerals $X_1$ to $X_4$ and $Y_1$ to $Y_4$ denote PWM control carrier signals. Signals $Y_1$ to $Y_4$ are inverted signals of signals $X_1$ to $X_4$. Signals $X_1$, $X_2$, $X_3$, and $X_4$ have a phase difference of 45° from each other.

The principal circuit arrangement of inverter INV-1 is as shown in FIG. 9 described above.

Input control signal $H_{OU}^*$ is compared with carrier (triangular wave) $X_1$ to generate gate signal $g_1$, thereby firing-control elements $S_{11}$ and $S_{12}$ of inverter INV-1. That is, When $H_{OU}^* \geq X_1$, $g_1 = $ "1", and $S_{11}$: ON, $S_{12}$: OFF When $H_{OU}^* < X_1$, $g_1 = $ "0", and $S_{11}$: OFF, $S_{12}$: ON $H_{OU}*$ and $Y_1$ are compared with each other to generate gate signal $g_1'$, thereby firing-control elements $S_{13}$ and $S_{14}$. That is, When $H_{OU}* \geq Y_1$, $g_1'$ = "1", and $S_{13}$: OFF, $S_{14}$: ON When $H_{OU}* < Y_1$, $g_1'$ = "0", and $S_{13}$: ON, $S_{14}$: OFF As a result, output voltage $V_1$ of inverter INV-1 becomes $V_1 = +V_d$ when elements $S_{11}$ and $S_{14}$ are ON; $V_1 = -V_d$ when $S_{12}$ and $S_{13}$ are ON; and $V_1 = 0$ in other modes. Thus, output signal $V_1$ has a waveform, as shown in FIG. 14D.

Similarly, input control signal $H_{OU}*$ is compared with triangular waves $X_2$ and $Y_2$ to generate gate signals $g_2$ and $g_2'$ for inverter INV-2. $H_{OU}*$ is compared with $X_3$ and $Y_3$ to generate gate signals $g_3$ and $g_3'$ for inverter INV-3. $H_{OU}*$ is compared with $X_4$ and $Y_4$ to generate gate signals $g_4$ and $g_4'$ for inverter INV-4.

As a result, output voltages $V_2$, $V_3$, and $V_4$ of inverters INV-2 to INV-4 are as shown in FIGS. 14G, 14J, and 14M.

A sum of output voltages $V_1$ to $V_4$ of inverters INV-1 to INV-4 has a waveform as shown in FIG. 14N, and is proportional to input signal $H_{OU}*$. Sum voltage $V_1 + V_2 + V_3 + V_4 = -\Delta V_5$ cancels harmonic component $\Delta V_5$ of voltage $V_5$ generated by direct-connection inverter INV-5.

When compensation control signal $H_{OU}*$ expressed by equation (18) is input as PWM control input signal $e_1 = e_2 = e_3 = e_4 = H_{OU}*$ of inverters INV-1 to INV-4, average values of output voltages $V_1$ to $V_4$ of the inverters are proportional to corresponding input signals $e_1$ to $e_4$, and their sum voltage $V_1 + V_2 + V_3 + V_4$ is proportional to $4 \cdot H_{OU}*$.

$$V_1 + V_2 + V_3 + V_4 = \frac{V_d}{E_{max}} \cdot 4 \cdot H_{OU}* \quad (19)$$

When equations (17) and (18) are substituted in equation (19) for n=4, equation (19) is rewritten as:

$$V_1 + V_2 + V_3 + V_4 = -\frac{V_d}{E_{max}} \cdot \frac{\Delta e_5}{2} \quad (20)$$
$$= -(V_5 - V_5) = -\Delta V_5$$

In this manner, harmonic voltage $V_5$ generated by direct-connection inverter INV-5 can be compensation-controlled to be canceled by multiplexed inverters INV-1 to INV-4. As a result, the carrier frequency of the direct-connection inverter can be lowered, and a switching loss and a snubber circuit loss can be reduced.

Figures 15A, 15B, 15C:
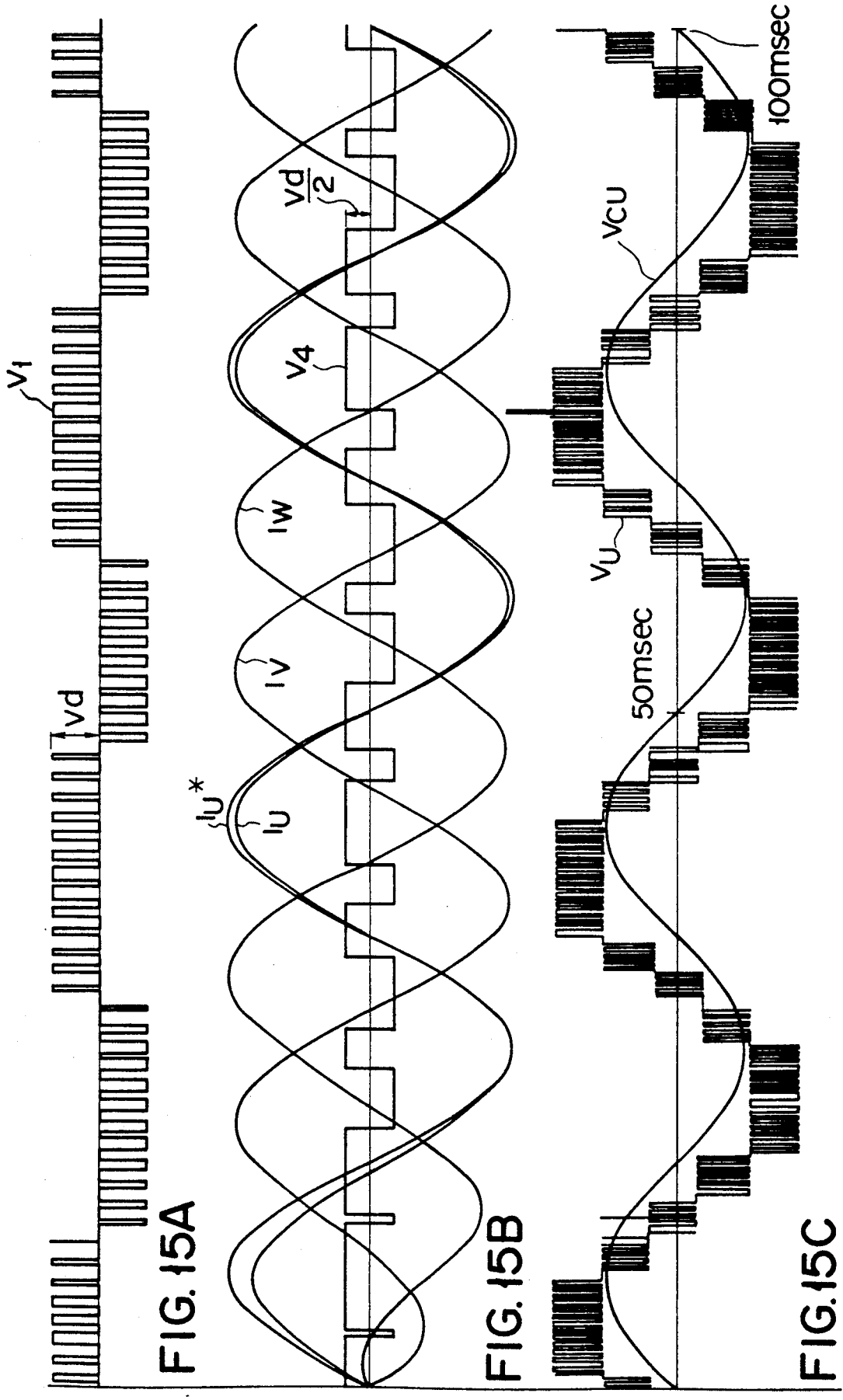
FIGS. 15A-15C are views showing computer simulation results which demonstrate the effect of the control method of the present invention.
Figure 16A:
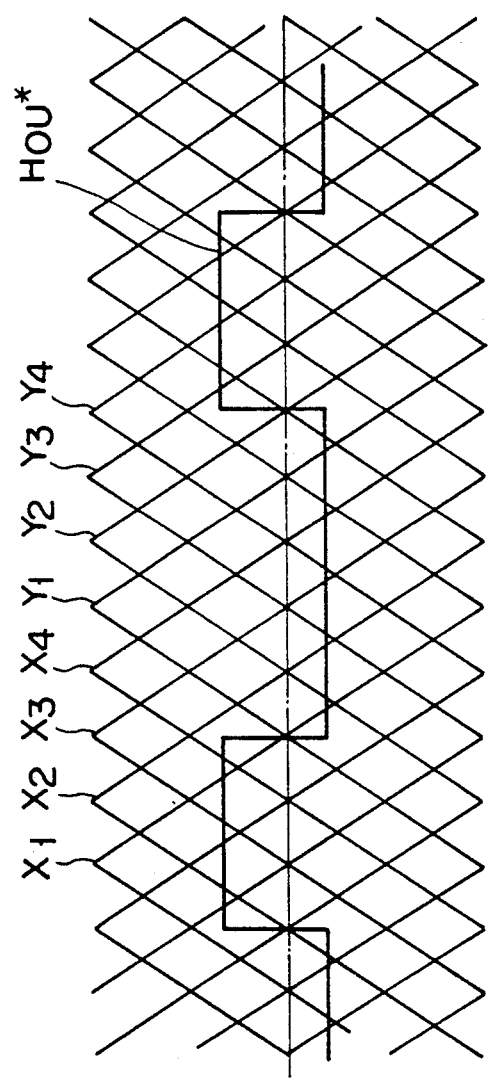
Figure 17:
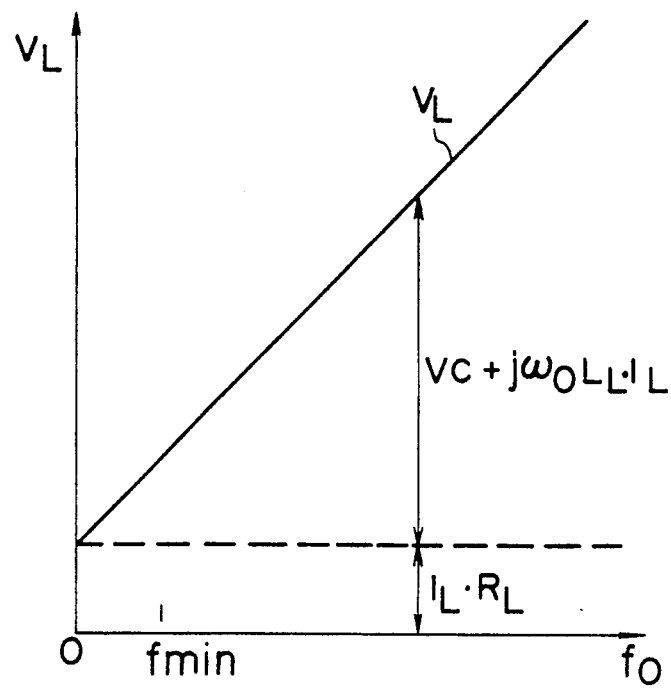
FIGS. 17 and 18 are graphs for explaining an operation of the converter shown in FIG. 8.
Figure 18:
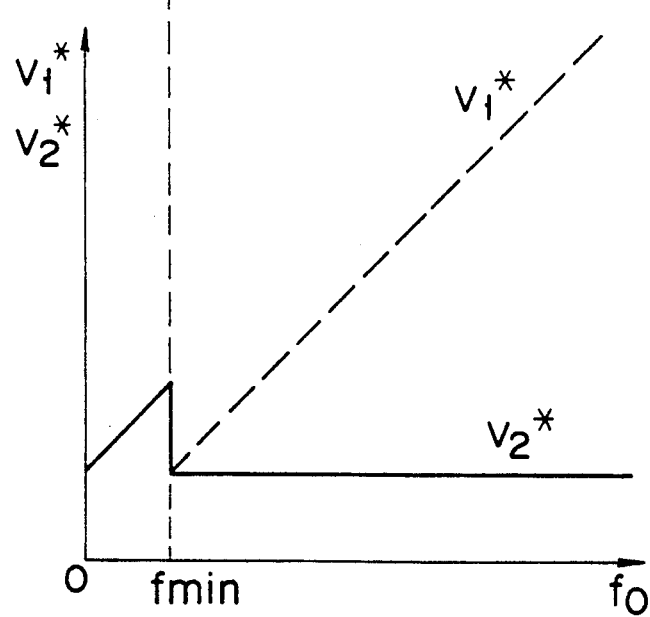

FIGS. 15A to 15C show computer simulation results of the converter of the present invention, and illustrate three-phase output currents $I_U$, $I_V$, and $I_W$, U-phase output voltage $V_U$, counter electromotive force $V_{CU}$, output voltage $V_1$ of one multiplexed PWM inverter, and output voltage $V_4$ of the direct-connection inverter when an output frequency is 30 Hz. Note that the load comprises an AC motor, the multiplexed inverter has a three-stage structure, the PWM control carrier frequency of the multiplexed inverter is 350 Hz, and the PWM control carrier frequency of the direct-connection inverter is 120 Hz. Although the carrier frequency of the direct-connection inverter is lowered, load currents $I_U$, $I_V$, and $I_W$ of its component are free from pulsation, and are controlled to be sinusoidal currents free from distortion.

In this manner, load current $I_U$ is controlled according to its instruction value $I_U*$. In this case, one problem is posed. More specifically, when PWM control carrier frequency $f_{CA}$ of the multiplexed inverter is set to be the same as PWM control carrier frequency $f_{CB}$ of the direct-connection inverter, voltages generated by inverters constituting the multiplexed inverter are deviated to the positive or negative side when a harmonic voltage component generated by the direct-connection inverter is to be compensated for.

FIGS. 16A to 16H are timing charts when compensation voltage $H_{OU}*$ as a PWM control input signal is perfectly synchronous with carrier signals $X_2$ to $X_4$ and $Y_1$ to $Y_4$ of the multiplexed inverter. Since compensation voltage $H_{OU}*$ is synchronous with carrier signal $X_5$ of the direct-connection inverter, the above-mentioned state occurs when carrier signals $X_1$ to $X_4$ or $Y_1$ to $Y_4$ have the same frequency and PWM control input signal $e_5$ of direct-connection inverter INV-5 is constant.

$H_{OU}*$ and $X_1$ are compared with each other to generate gate signal $g_1$, and $H_{OU}*$ and $Y_1$ are compared with each other to generate gate signal $g_1'$, as described above. As a result, output voltage $V_1$ of inverter INV-1 becomes as shown in FIG. 16D. Similarly, output voltages $V_2$ to $V_4$ of inverters INV-2 to INV-4 become as shown in FIGS. 16E to 16G, and output voltage $V_1 + V_2 + V_3 + V_4$ of the multiplexed inverter has a waveform shown in FIG. 16H. This voltage is proportional to compensation voltage $H_{OU}*$, and corresponds to an inverted value of harmonic component $V_5$ of output voltage $V_5$ of direct-connection inverter INV-5.

In this case, in output voltages $V_1$ to $V_4$ of the inverters constituting the multiplexed inverter, integrated values of positive voltage components do not coincide with those of negative voltage components. For example, in output voltage $V_1$, negative voltage components are larger than positive voltage components. The same applies to $V_2$. Contrary to this, in $V_3$ and $V_4'$ positive voltage components are larger than negative voltage components. In the multiplexed inverter as a whole, $V_1 + V_2 + V_3 + V_4$ is balanced between the positive and negative sides.

When carrier signals $X_1$ to $X_4$ ($Y_1$ to $Y_4$) are synchronous with compensation voltage $H_{OU}*$, this state permanently continues. For example, this is equivalent to a state that a negative DC bias voltage is applied to output transformer $TR_1$, and DC polarized magnetization occurs in the iron core. The same applies to other output transformers $TR_2$ to $TR_4$.

DC polarized magnetization is finally corrected since inverters INV-1 to INV-4 control primary or exciting currents of their transformers, as described above. However, it is not preferable to create a cause of DC polarized magnetization, and this may disturb current control. When the DC polarized magnetization is corrected, a compensation control operation of a harmonic voltage component of the direct-connection inverter is disturbed, and proper compensation may become impossible.

In the controller shown in FIG. 13, therefore, carrier generators $TRG_1$ and $TRG_2$ respectively generate carrier signals $X_1$ to $X_4$ ($Y_1$ to $Y_4$) to be supplied to PWM controllers $PWM_1$ to $PWM_4$ of the multiplexed inverter, and carrier signal $X_5$ to be supplied to PWM controller PWM5 of the direct-connection inverter so as to have different frequencies $f_{CA}$ and $f_{CB}$.

In this manner, for example, voltage $V_1$ generated by one multiplexed inverter INV-1 may instantaneously have a large positive or negative voltage level. However, in terms of an average value, voltage $V_1$ is proportional to input signal $H_{OU}^*$ (assuming that $e_1 = H_{OU}^*$), and will never cause DC polarized magnetization of output transformer $TR_1$. The same applies to other output transformers $TR_2$ to $TR_4$.

As a result, primary current control (or excitation current control) of the output transformers by the corresponding inverters will not be disturbed, and a current free from waveform distortion can be supplied. A harmonic voltage component generated by the direct-connection inverter can be accurately compensated for by the multiplexed inverter.

The inverter output corresponding to one phase (U phase) has been described above. However, the same applies to V and W phases.

Compensation signal $H_{OU}^*$ for canceling harmonic voltage component $\Delta V_5$ generated by direct-connection inverter INV-5 is directly obtained from gate signal $g_5$ and PWM control input signal $e_5$, thereby canceling all the harmonic components. Alternatively, signal $g_5$ may be frequency-analyzed to extract and compensate for a specific harmonic component therefrom.

As described above, according to the power converter of the present invention, DC polarized magnetization of the output transformers of the multiplexed PWM inverter can be prevented, and elements constituting the inverter can be prevented from being destroyed by an overcurrent. At the same time, the load current can be accurately controlled by the direct-connection inverter, and a sinusoidal current free from a waveform distortion can be supplied to an AC load.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

What is claimed is:

1. A power converter for supplying an AC load with a sum of an output voltage of a first PWM inverter having an output transformer, and an output voltage from a second PWM inverter having no output transformer, wherein said first PWM inverter comprises means for controlling a primary or exciting current of the output transformer connected thereto, and said second PWM inverter comprises means for controlling a current to be supplied to said AC load.

2. A power converter according to claim 1, wherein said first PWM inverter having the output transformer comprises means for performing compensation control to generate, for said AC load, a voltage corresponding to a counter electromotive force of said AC load and a voltage drop caused by an inductance of said AC load.

3. A power converter according to claim 1, wherein said second PWM inverter having no output transformer comprises means for performing compensation control to generate a voltage corresponding to a voltage drop caused by a resistance of said AC load.

4. A power converter according to claim 1, wherein said first PWM inverter having the output transformer comprises means for performing control so that an exciting current of the output transformer becomes zero when an output frequency of said first PWM inverter is not more than a certain minimum frequency.

5. A power converter according to claim 1, wherein said first PWM inverter having the output transformer sets a counter electromotive force compensation value of said AC load and a voltage drop compensation value of the inductance to be zero when an output frequency of said first PWM inverter is not more than a certain minimum frequency.

6. A power converter according to claim 1, wherein said first PWM inverter having the output transformer comprises means for performing compensation control to cancel a harmonic component of an output voltage generated by said second PWM inverter having no output transformer.

7. A power converter comprising:
   at least one first PWM inverter operated with a first carrier frequency, said first PWM inverter having an output transformer which couples the first PWM inverter to an AC load;
   a second PWM inverter operated with a second carrier frequency;
   means for supplying said AC load with a sum of a first voltage from the output transformer of said first PWM inverter and a second voltage from said second PWM inverter; and
   means for reducing or cancelling out higher harmonic components contained in the second voltage from said second PWM inverter, using an operation of said first PWM inverter.

8. A power converter according to claim 1, wherein said first PWM inverter includes a plurality of inverter units.

9. A power converter for supplying an AC load with a sum of an output voltage of a first PWM inverter having an output transformer, and an output voltage from a second PWM inverter having no output transformer, wherein said first PWM inverter comprises means for controlling a primary or exciting current of the output transformer connected thereto, and said second PWM inverter comprises means for controlling a current to be supplied to said AC load, said power converter comprises means for supplying power having a variable-voltage and variable-frequency to said AC load.

* * * * *